US012287659B2

(12) United States Patent
Zhang et al.

(10) Patent No.: US 12,287,659 B2
(45) Date of Patent: Apr. 29, 2025

(54) LOW-DROPOUT REGULATOR FOR LOW VOLTAGE APPLICATIONS

(71) Applicant: ams-Osram AG, Premstätten (AT)

(72) Inventors: Cheng Zhang, Graz (AT); Emir Serdarevic, Feldkirchen (AT)

(73) Assignee: AMS-OSRAM AG, Premstätten (AT)

(*) Notice: Subject to any disclaimer, the term of this patent is extended or adjusted under 35 U.S.C. 154(b) by 212 days.

(21) Appl. No.: 18/011,753

(22) PCT Filed: May 6, 2021

(86) PCT No.: PCT/EP2021/061980
§ 371 (c)(1),
(2) Date: Dec. 20, 2022

(87) PCT Pub. No.: WO2022/002465
PCT Pub. Date: Jan. 6, 2022

(65) Prior Publication Data

US 2023/0229182 A1 Jul. 20, 2023

(30) Foreign Application Priority Data

Jun. 29, 2020 (EP) .................................... 20182918

(51) Int. Cl.
*G05F 1/575* (2006.01)
*G05F 1/56* (2006.01)
*G05F 1/565* (2006.01)

(52) U.S. Cl.
CPC .............. *G05F 1/575* (2013.01); *G05F 1/565* (2013.01)

(58) Field of Classification Search
CPC ................................. G05F 1/565; G05F 1/575
See application file for complete search history.

(56) References Cited

U.S. PATENT DOCUMENTS

| | | | | |
|---|---|---|---|---|
| 9,024,602 B2 * | 5/2015 | Fort | G05F 1/46 323/280 |
| 9,946,283 B1 * | 4/2018 | Yung | G05F 1/575 |

(Continued)

FOREIGN PATENT DOCUMENTS

| | | |
|---|---|---|
| CN | 103383580 B | 7/2015 |
| CN | 107918433 A | 4/2018 |

(Continued)

OTHER PUBLICATIONS

Chun-Yu Hsieh "A Low-Dropout Regulator With Smooth Peak Current Control Topology for Overcurrent Protection" 2010 (Year: 2010).*

(Continued)

*Primary Examiner* — Sisay G Tiku
(74) *Attorney, Agent, or Firm* — MH2 Technology Law Group LLP

(57) ABSTRACT

A low-dropout regulator for low voltage applications includes a buffer circuit being arranged between an output terminal of an error amplifier and a control node of a pass device. The buffer circuit includes a driver having a first transistor being embodied as an NMOS transistor. The output terminal of the error amplifier is coupled to the control node of the first transistor. The control node of the pass device is coupled to an internal node of a first current path including the first transistor. The low-dropout regulator has high load capability, even if an input supply voltage is very low.

16 Claims, 4 Drawing Sheets

(56) References Cited

U.S. PATENT DOCUMENTS

| | | | | |
|---|---|---|---|---|
| 10,146,240 | B1 * | 12/2018 | Wang | G05F 3/242 |
| 10,498,333 | B1 | 12/2019 | Ankamreddi et al. | |
| 2010/0026254 | A1 * | 2/2010 | Kao | G05F 1/573 323/278 |
| 2013/0285631 | A1 * | 10/2013 | Bisson | G05F 1/575 323/280 |
| 2014/0191739 | A1 * | 7/2014 | Kim | G05F 1/575 323/280 |
| 2015/0015223 | A1 * | 1/2015 | Chen | G05F 1/575 323/280 |
| 2017/0090493 | A1 * | 3/2017 | Cui | G05F 1/575 |
| 2017/0371365 | A1 * | 12/2017 | Kossel | G05F 1/46 |
| 2019/0324484 | A1 * | 10/2019 | Cheng | H03K 5/24 |
| 2022/0091623 | A1 * | 3/2022 | Dyer | G05F 1/5735 |
| 2024/0053781 | A1 * | 2/2024 | Fiocchi | G05F 1/575 |

FOREIGN PATENT DOCUMENTS

| | | | | |
|---|---|---|---|---|
| CN | 106558987 | B * | 12/2019 | G05F 1/575 |
| CN | 111176358 | A | 5/2020 | |
| CN | 117234269 | A * | 12/2023 | |
| WO | 2019048828 | A1 | 3/2019 | |

OTHER PUBLICATIONS

Al-Shyoukh M. et al.: "A Transient-Enhanced Low-Quiescent Current Low-Dropout Regulator With Buffer Impedance Attenuation" in IEEE Journal of Solid-State Circuits, vol. 42, No. 8, Aug. 2007.

Vijith Vijayakumaran Nair et al.: "An Integrated Chip High-Voltage Power Receiver for Wireless Biomedical Implants" Energies 2015, 8, 5467-5487; doi:10.3390/en8065467; ISSN 1996-1073.

Arias Perez, Jagoba (EP Authorized Officer), International Search Report and Written Opinion in corresponding International Application No. PCT/EP2021/061980 mailed on Jul. 29, 2021, 19 pages.

* cited by examiner

LOW-DROPOUT REGULATOR FOR LOW VOLTAGE APPLICATIONS

CROSS-REFERENCE TO RELATED APPLICATIONS

The present application is the national stage entry of International Patent Application No. PCT/EP2021/061980, filed on May 6, 2021, and published as WO 2021/002465 A1 on Jan. 6, 2022, which claims the benefit of priority of EP Patent Application No. 20182918.1, filed on Jun. 29, 2020, all of which are incorporated by reference herein in their entireties.

TECHNICAL FIELD

The disclosure relates to a low-dropout regulator for low voltage applications and to a communication device including the low-dropout regulator for providing a regulated output voltage for supplying power to electronic circuitries inside of the communication device.

BACKGROUND

Low-dropout regulators (LDOs) are used for power management in the majority of battery-powered portable devices. Most integrated circuits need internal LDOs to convert battery voltage that is changing to a stable internal supply, which is needed for blocks inside of the integrated circuits. The future development of electronic circuits is increasingly moving towards the use of low supply voltages for driving high loads in order to reduce the standby power and prolong the battery runtime.

There is a desire to provide a design of a low-dropout regulator for low voltage applications which can be operated with a wide range of load current and input supply voltage.

SUMMARY

An embodiment of a low-dropout regulator that may be used in low voltage applications with wide input supply voltage range and wide load current range to provide a stable output voltage is specified in claim 1.

The low-dropout regulator comprises an input supply terminal to provide an input supply voltage, and a reference supply terminal to provide a reference supply voltage. The low-dropout regulator further comprises an error amplifier having a first and second input terminal and an output terminal. The low-dropout regulator comprises a pass device having a control node to control a conductivity of the pass device, and a buffer circuit arranged between the output terminal of the error amplifier and the control node of the pass device.

The buffer circuit comprises a first current path arranged between the input supply terminal and the reference supply terminal. The first current path includes a driver comprising a first transistor having a control node to control a conductivity of the first transistor. The first transistor is embodied as an NMOS transistor. The output terminal of the error amplifier is coupled to the control node of the first transistor. The control node of the pass device is coupled to a first internal node of the first current path located between the first transistor and the reference supply terminal.

The proposed LDO design may be used even if the specification of the LDO requires a wide input voltage range and a wide load range with a small output capacitor. Moreover, the proposed design of a low-dropout regulator gives the possibility to realize a stable internal LDO of an electric circuitry with high efficiency and high load capability, for example to drive up an output load current of more than 100 mA, even if the output voltage needs to be very near to the input supply voltage and even if the input supply voltage is very low. In particular, the LDO design allows the use of the low-dropout regulator in devices having a low input supply voltage range, for example 1.1 V, . . . , 1.8 V.

The first transistor has a drain node coupled to the input supply terminal, and a source node coupled to the internal node of the first current path. According to a preferred embodiment of the low-dropout regulator, the first transistor is configured as a source follower transistor. In particular, the first transistor may be embodied as a native NMOS transistor.

According to a further possible embodiment of the low-dropout regulator, the buffer circuit comprises a second transistor arranged between the power supply terminal and the internal node of the first current path. The second transistor is configured as a PMOS transistor. The second transistor has a source node coupled to the power supply terminal, and a drain node coupled to the first internal node of the first current path.

The arrangement of the second transistor between the power supply terminal and the first internal node of the first current path enables to realize the buffer circuit with dynamically-biased shunt feedback for output resistance reduction under different load currents.

According to an embodiment of the low-dropout regulator, the first current path comprises a current source being arranged in the first current path between the power supply terminal and the first transistor.

According to an embodiment of the low-dropout regulator, the second transistor has a control node being connected to a second internal node of the first current path. The second internal node of the first current path is arranged between the current source of the first current path and the first transistor.

According to a possible embodiment of the low-dropout regulator, the low-dropout regulator comprises a third transistor being arranged between the power supply terminal and the second internal node of the first current path. The third transistor has a source node being connected to the power supply terminal, and a drain node being connected to the second internal node of the first current path. The third transistor has a control node to apply a control signal for controlling a conductivity of the third transistor.

The buffer circuit is configured to generate the control signal for controlling the conductivity of the third transistor in response to an amount of a load current of the low-dropout regulator. In particular, the buffer circuit is configured to sense the load current of the low-dropout regulator, and to compare the sensed load current with a constant current. The result of the comparison is then used to turn on the third transistor, when the load current is very low. The third transistor is configured as a PMOS switch. As a consequence, since the source node of the third transistor and the control node of the second transistor are coupled together, the second transistor is turned off in order to keep the first transistor in saturation, when a low load current is detected.

According to a possible embodiment of the low-dropout regulator, the buffer circuit comprises a current mirror configured to provide a biasing current in the first current path of the buffer circuit. The buffer circuit comprises a second current path. The current mirror is configured to provide the bias current in the first current path of the buffer circuit in response to a current in the second current path.

According to a possible embodiment of the low-dropout regulator, the buffer circuit comprises a fourth transistor. The second current path comprises a second current source being arranged between the power supply terminal and the current mirror. The fourth transistor is arranged between the power supply terminal and a third internal node of the second current path located between the second current source and the current mirror.

This arrangement enables the biasing current of the buffer circuit to be adjusted in response to the sensed load current. In particular, the configuration allows the buffer circuit to be operated with a higher biasing current, when the load current increases.

According to an embodiment of the low-dropout regulator, the low-dropout regulator comprises an output current path including the pass device and an output terminal to provide a regulated output voltage. The low-dropout regulator comprises a feedback path including a capacitor being arranged between the output terminal and a third input terminal of the error amplifier.

The arrangement of the capacitor in the feedback path between the output terminal and the third input terminal of the error amplifier enables to provide the low-dropout regulator with Miller frequency compensation to achieve stability in the full range of the load current.

An embodiment of a communication device comprising the low-dropout regulator is specified in claim 15.

In particular, the low-dropout regulator may be used to provide a regulated output voltage in a plurality of communication devices, for example devices being embodied as a sensor or as a battery-powered device.

Additional features and advantages of the low-dropout regulator are set forth in the detailed description that follows. It is to be understood that both the foregoing general description and the following detailed description are merely exemplary, and are intended to provide an overview or framework for understanding the nature and character of the claims.

BRIEF DESCRIPTION OF THE DRAWINGS

The accompanying drawings are included to provide further understanding, and are incorporated in, and constitute a part of, the specification. As such, the disclosure will be more fully understood from the following detailed description, taken in conjunction with the accompanying figures in which.

DETAILED DESCRIPTION OF THE EMBODIMENTS

Figure 1:
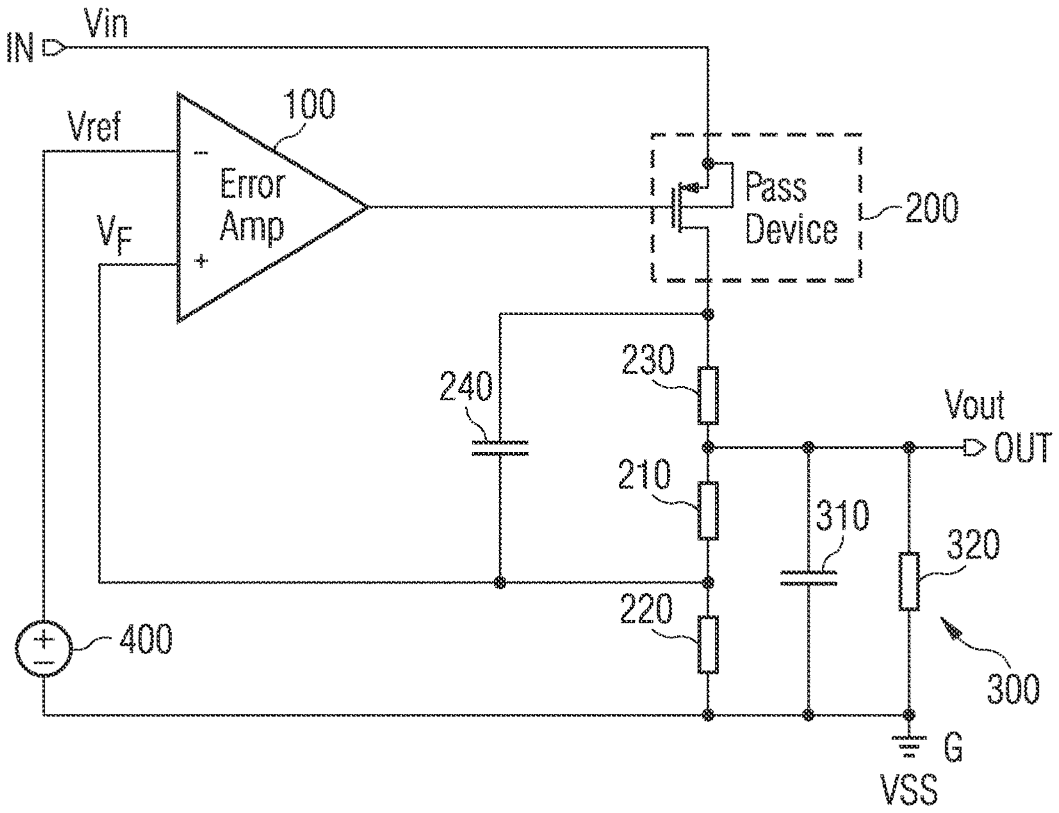
FIG 1 PRIOR ART
FIG. 1 illustrates a basic structure of a low-dropout regulator.

FIG. 1 shows a schematic of the basic structure of a low-dropout regulator comprising a pass device 200 being arranged between an input supply terminal IN to provide an input supply voltage Vin and an output terminal OUT to provide a regulated output voltage Vout. A load 300 represented by capacitor 310 and a resistor 320 may be coupled to the output terminal OUT. The pass device 200 is controlled by an error amplifier 100 which generates a control signal for the pass device 200 in dependence on a comparison of a reference voltage Vref and a feedback voltage Vf. The reference voltage Vref may be provided by a voltage source 400, for example a voltage source for providing a bandgap voltage. The feedback voltage Vf has a level in response to the regulated output voltage Vout. The feedback voltage Vf is tapped at a voltage divider comprising the resistors 210 and 220, and applied to the error amplifier via a feedback path.

The structure of an LDO shown in FIG. 1 can be used in many applications to provide a regulated output voltage Vout which may be used as a stable internal supply for other electronic blocks of an electronic circuitry or device.

As illustrated in FIG. 1, a resistor 230 is provided in series with the pass device 200, and a capacitor 240 is connected to the drain node of the pass device 200 and the feedback path. The resistor 230 and the capacitor 240 may be introduced to create a low frequency zero for frequency compensation. However, if a low-dropout regulator embodied as shown in FIG. 1 is required to drive up a high load current, for example a current up to 200 mA, the voltage drop across the resistor 230 will significantly limit the minimum input supply voltage Vin. As a consequence, the basic approach of a low-dropout regulator shown in FIG. 1 is only applicable for an LDO which operates over a limited load current range. Moreover, large load current also requires a larger size of the pass device 200, and thus, makes frequency compensation difficult.

Figure 2:
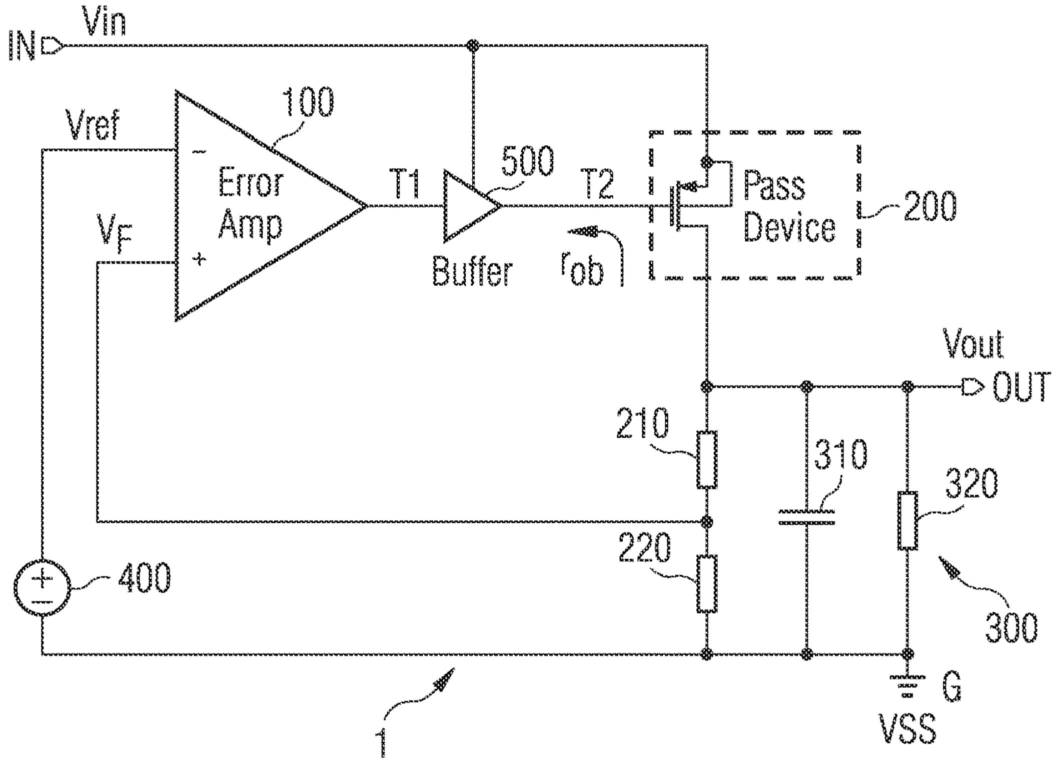
FIG 2 PRIOR ART
FIG. 2 illustrates a configuration of a low-dropout regulator with a buffer circuit being arranged between an error amplifier and a pass device of the regulator.

FIG. 2 shows an another embodiment of a low-dropout regulator being similar to the structure of FIG. 1 with the difference that a buffer circuit/stage 500 is provided between the error amplifier 100 and the pass device 200. The error amplifier 100 is configured to compare a scaled-down output signal Vf derived from the output signal/voltage Vout to a reference voltage Vref provided by a (bandgap) voltage source 400. A control node of the pass device 200, which is realized as a transistor, is connected to the output of the intermediate buffer circuit/stage 500 for driving the pass device 200. The buffer circuit/stage 500 enables to drive the pass device 200 in the presence of high load currents due to the bigger pass device.

Basically, different solutions for the error amplifier 100 and the buffer circuit 500 can be used depending on the specification that is required.

Figure 3:
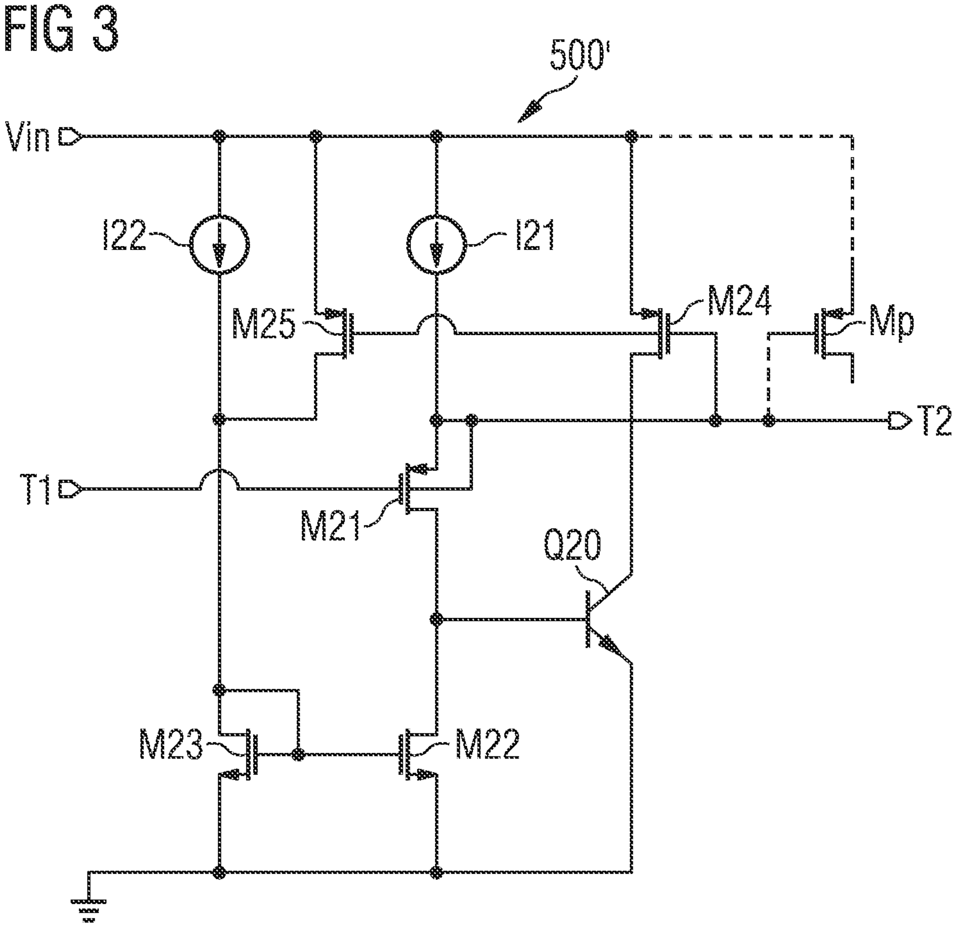
FIG. 3 illustrates a structure of a buffer circuit of a low-dropout regulator.

A possible approach to realize a low-dropout regulator with an intermediate buffer circuit is illustrated in FIG. 3. This design of an intermediate buffer circuit 500' is shown by Mohammad Al-Shyoukh, Hoi Lee, Member IEEE and Raul Perez, Member IEEE: “A Transient-Enhanced Low-Quiescent Current Low-Dropout Regulator With Buffer Impedance Attenuation”, in IEEE Journal of Solid-State Circuits, vol. 42, no. 8, August 2007. The various elements of the buffer circuit 500' shown in FIG. 3 are referenced according to the labelling in the above-mentioned document with the exception of the nodes T1 and T2. Node T1 of buffer circuit 500' is connected to the output node of the error amplifier 100, and node T2 of buffer circuit 500' is connected to the control node of the transistor of pass device 200.

Referring to FIG. 3, a transistor M21 configured as a source-follower is coupled with its control/gate node to the output node T1 of the error amplifier 100. The source-follower M21 is provided with negative feedback. In particular, an npn transistor Q20 being configured as a feedback device is connected in parallel to the output of the source-follower M21 in order to reduce an output resistance of the buffer circuit through shunt feedback. The buffer circuit is realized with a so-called buffer impedance attenuation (BIA) technique in which two PMOS transistors M24 and M25 and the npn transistor Q20 realize dynamically-biased shunt feedback to decrease the output resistance of the buffer circuit under different load current conditions.

The proposed BIA technique efficiently reduces the output impedance of the buffer circuit through the dynamically-biased shunt feedback. As a result, the pole at the gate of the pass device Mp is pushed far beyond the unity-gain frequency of the LDO regulation loop over the entire load current range, even if a huge pass device is used to achieve low dropout voltage and for sourcing high load current.

However, although there is no series resistor connected to the pass device, this kind of regulator still cannot work with very low input supply voltage, for example an input supply voltage in the range of between 1.1 V to 1.8 V, due to an additional gate-source voltage introduced by the PMOS transistor M21 in the buffer.

The transistor Mp of the pass device 200 and the transistor M21 respectively need a gate-source voltage to be higher than its respective threshold voltage. Both are embodied as PMOS transistors, so that the potential at node T1 is lower by at least two threshold voltages of the PMOS transistor than the input supply voltage Vin.

In conclusion, even if the solution of the buffer circuit 500' has a high performance, there is a serious limitation. If the input supply voltage Vin is very low and the potential at the output node T1 of the error amplifier is even lower by two threshold voltages, there is no headroom anymore for NMOS transistors in the error amplifier structure.

Figure 4:
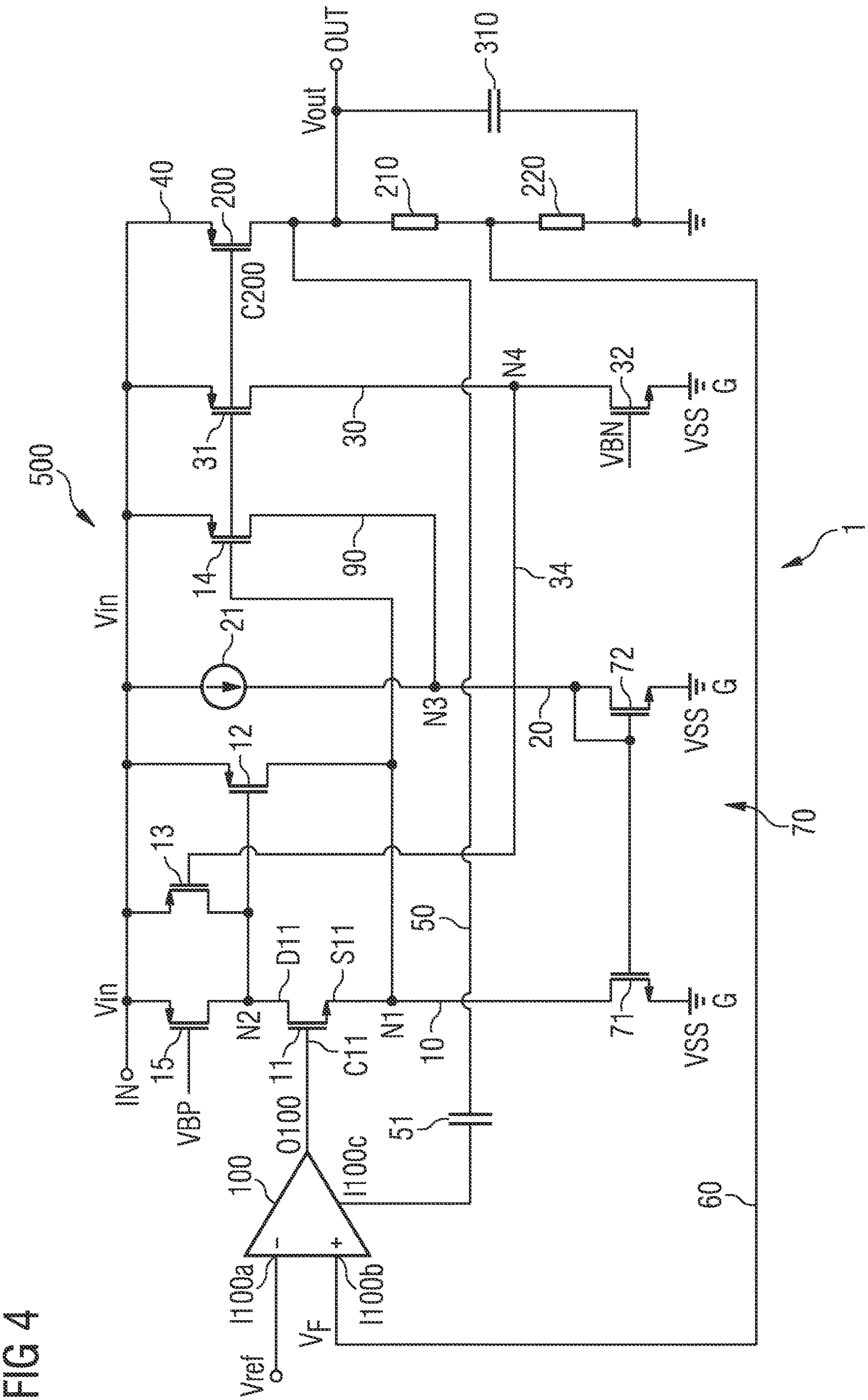
FIG. 4 illustrates an embodiment of a low-dropout regulator for low voltage applications.

FIG. 4 shows an improved approach of a low-dropout regulator 1 to realize a stable internal LDO with high efficiency and high load capability, for example an LDO capable of driving loads of more than 100 mA, even if the output voltage Vout needs to be very near to the input supply voltage Vin, and even if the input supply voltage Vin is very low. This gives the possibility to realize the LDO even with the specification of a wide input voltage range and wide load range.

Referring to the embodiment of the low-dropout regulator 1 for low voltage applications shown in FIG. 4, the LDO comprises an input supply terminal IN to provide an input supply voltage Vin, and a reference supply terminal G to provide a reference supply voltage VSS. The reference supply voltage can be a ground potential or a negative supply potential. The low-dropout regulator 1 comprises an error amplifier 100 having a first input terminal I100*a* to apply a reference signal Vref and a second input terminal I100*b* and an output terminal O100. The low-dropout regulator further comprises a pass device 200 having a control node C200 to control a conductivity of the pass device 200, and a buffer circuit 500. The pass device 200 may be configured as a PMOS transistor. The buffer circuit 500 is arranged between the output terminal O100 of the error amplifier 100 and the control node C200 of the pass device 200.

The pass device 200 is arranged in an output current path 40 in series with a resistive divider comprising resistors 210 and 220. The LDO 1 provides regulated output voltage Vout at output terminal OUT. FIG. 4 further shows capacitive load 310 being coupled to the output terminal OUT. A feedback path 60 is coupled between the output current path 40 and the second input terminal I100*b* of the error amplifier to feed back a feedback signal Vf to the error amplifier 100, the feedback signal Vf being derived from the output signal Vout.

The buffer circuit 500 comprises a first current path 10 arranged between the input supply terminal IN and the reference supply terminal G. The first current path 10 includes a driver comprising a first transistor 11. The first transistor 11 has a control/gate node C11 to control the conductivity of the first transistor 11. In particular, the first transistor 11 is embodied as an NMOS transistor. The output terminal O100 of the error amplifier 100 is coupled to the control node C11 of the first transistor 11 of the driver. The control node C200 of the pass device 200 is coupled to a first internal node N1 of the first current path 10. The first internal node N1 of the first current path 10 is located between the first transistor 11 and the reference supply terminal G.

The first transistor 11 of the driver has a drain node D11 coupled to the input supply terminal IN, and a source node S11 coupled to the internal node N1 of the first current path 10. The first transistor of the driver is configured as a source follower transistor. To give enough headroom to error amplifier output at low loads, according to an advantageous embodiment of the low-dropout regulator 1, the first transistor 11 can be embodied as a native NMOS transistor.

If the design of the circuit buffer 500 shown in FIG. 4 is compared to the approach of the buffer circuit as illustrated in FIG. 3, it is noticeable that the new buffer design is realized with a driver comprising or being configured as an NMOS transistor 11, particularly a NMOS source follower, connected to the output terminal O100 of the error amplifier 100 instead of using PMOS transistor M21 for the driver of the buffer circuit approach 500' shown in FIG. 3. This has the benefit that the low-dropout regulator 1 can work for low input supply voltage. In particular, the low-dropout regulator 1 of FIG. 4 can be operated with an input supply voltage between 1.1 V, . . . , 1.8 V and a regulated output voltage Vout of 0.9 V. The proposed design of the low-dropout regulator gives the possibility to use a wide range of input supply voltage and load current.

According to the embodiment of the low-dropout regulator 1, the buffer circuit 500 comprises a second transistor 12. The second transistor 12 is arranged between the power supply terminal IN and the first internal node N1 of the first current path 10. The second transistor 12 is configured as a PMOS transistor. In particular, the second transistor 12 has a source node coupled to the power supply terminal IN, and a drain node coupled to the first internal node N1 of the first current path 10.

The arrangement of the second transistor 12 in a current path between the power supply terminal IN and the first internal node N1 of the first current path enables the buffer circuit 500 to be provided with dynamically-biased shunt feedback for output resistance reduction under different load currents to achieve high stability of the LDO.

Referring to FIG. 4, the first current path 10 comprises a current source 15 being arranged in the first current path 10 between the power supply terminal IN and the first transistor 11. The second transistor 12 has a control node being connected to a second internal node N2 of the first current path 10. The second internal node N2 is arranged between the current source 15 of the first current path 10 and the first transistor 11. The current source 15 comprises a transistor having a source node being connected to the power supply terminal IN and a drain node being connected to the second internal node N2 of the first current path 10.

The low-dropout regulator comprises a third transistor 13 being arranged between the power supply terminal IN and the second internal node N2 of the first current path 10. The third transistor 13 has a source node being connected to the power supply terminal IN, and a drain node being connected to the second internal node N2 of the first current path 10.

Comparing the structure of the buffer circuit 500' of FIG. 3 with the design of the buffer circuit 500 of FIG. 4, the structure of the buffer circuit 500' of FIG. 3 is "flipped" which means that the NMOS transistor 11 of the driver is used as a source follower transistor and PMOS transistor 12 is used as a local feedback transistor. This gives the possibility to realize the buffer circuit in a highly efficient way, even if the input supply voltage Vin is very low or the load is very high.

The third transistor 13 is configured as a switch, and has a control node to apply a control signal for controlling a conductivity of the third transistor 13. The buffer circuit 500 is configured to generate the control signal for controlling the conductivity of the third transistor 13 in response to an amount of a load current of the low-dropout regulator.

The buffer circuit is configured to generate the control signal for controlling the conductivity of the third transistor 13 in dependence on a level of a load current of the low-dropout regulator. For this purpose the low-dropout regulator 1 comprises a current path 30 being arranged between the power supply terminal IN and the reference supply terminal G to apply the reference supply voltage VSS. The current path 30 includes a current source 32 and a transistor 31 being connected in series between the power supply terminal IN and the reference supply terminal G. The current source 32 is configured as a transistor having a source node being connected to the reference supply terminal, and a drain node being connected to an internal node N4 of the third current path 30. The transistor 31 has a source node being connected to the power supply terminal IN and a drain node being connected to the internal node N4. The internal node N4 is connected to the control node of the third transistor 13.

The control/gate node of transistor 31 is coupled to the first internal node N1 of the first current path 10 in the same way as the control/gate node C200 of the pass transistor 200. This arrangement enables the buffer circuit 1 being configured to sense the load current of the low-dropout regulator. In particular, the load current is sensed and compared with a constant current provided by current source 32. As a result, the potential at node N4 depends on the level of the load current in relation to the level of the constant current of current source 32. The third transistor 13 is configured as a PMOS switch. Since the potential at node N4 is used as control signal for the third transistor 13, the result of the comparison of the load current and the constant current of current source 32 is used to turn the third transistor 13 on or off.

In particular, the third transistor 13 is turned on, i.e. operated in a state of low resistance, when the load current is very low. As a consequence, since the drain node of the third transistor 13 and the control/gate node of the second transistor 12 are coupled together, the second transistor 12 is turned off, i.e. operated in a state of high resistance, which allows to operate the first/source follower transistor 11 in saturation. This means that the local feedback is switched off for low loads to keep the source follower transistor 11 in saturation. This gives more headroom for the first transistor 11 at low loads, where the potential at the control/gate node of the pass device 200 is in any case near the input supply voltage Vin.

On the other hand, in the case of a high load current, the potential at internal node N4 is near the input supply voltage vin, and the third transistor 13 is turned off, i.e. operated in a state of high resistance. Consequently, the second transistor 12 is turned on so that the value of the output resistance of the buffer circuit is reduced which improves the stability of the LDO.

The buffer circuit 500 comprises a current mirror 70 being configured to provide a biasing current in the first current path 10 of the buffer circuit 500. The buffer circuit 500 comprises a second current path 20. The current mirror 70 is configured to provide the bias current in the first current path 10 in dependence on a current in the second current path 20.

The second current path 20 comprises a second current source 21 being arranged between the power supply terminal IN and the current mirror 70. The low-dropout regulator 1 further comprises a fourth transistor 14. The fourth transistor 14 is arranged between the power supply terminal IN and a third internal node N3 of the second current path 20 located between the second current source 21 and the current mirror 70.

As illustrated in FIG. 4, the current mirror 70 comprises a transistor 71 and a transistor 72 being connected to each other at the respective control/gate terminal. The transistor 71 is located in the first current path 10 between the first transistor 11 and the reference supply terminal G. The second transistor 72 is located in the second current path 20 of the buffer circuit between the current source 21 and the reference supply terminal G.

As shown in FIG. 4, the control/gate node of the fourth transistor 14 is coupled to the first internal node N1 in the same way as the control/gate node C200 of the pass device/transistor 200. The control/gate node of the fourth transistor 14 is connected to the control/gate node C200 of the pass device/transistor 200. Thus, the fourth transistor 14 is used to sense the load current and to adjust the biasing current of the buffer circuit so that the buffer circuit is operated with a higher biasing current, when a higher load current is detected.

The low-dropout regulator 1 comprises an output current path 40 including the pass device/transistor 200 and an output terminal OUT to provide the regulated output voltage Vout. The low-dropout regulator 1 comprises a feedback path 50 including a capacitor 51. The capacitor 51 is arranged between the output terminal OUT and a third input terminal I100*c* of the error amplifier 100.

The capacitor 51 provides Miller compensation to stabilize the LDO structure in order to achieve stability in the full range of the load current. By employing Miller compensation in the low-dropout regulator 1, only a single pole is realized within the unity-gain frequency and a good phase margin is achieved for the entire load current range with a small compensation capacitor.

Figure 5:
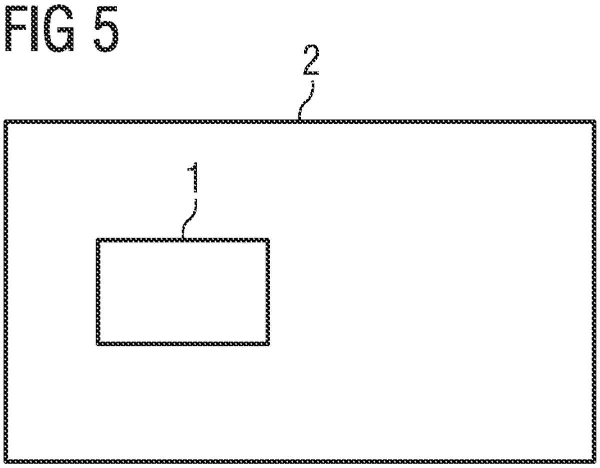
FIG. 5 shows a communication device including a low-dropout regulator.

The proposed design for the low-dropout regulator shown in FIG. 4 can be used, for example, for LDOs in sensor applications, portable applications or microprocessor applications. FIG. 5 shows the exemplified use of the low-dropout regulator 1 to provide a regulated output voltage in a communication device 2. The regulated output voltage may be used as a stable power supply for an electronic component of the communication device which can be embodied, for example, as a sensor or a battery-powered device.

The embodiments of the low-dropout regulator for low voltage applications disclosed herein have been discussed for the purpose of familiarizing the reader with novel aspects of the design of the voltage regulator. Although preferred embodiments have been shown and described, many changes, modifications, equivalents and substitutions of the disclosed concepts may be made by one having skill in the art without unnecessarily departing from the scope of the claims.

In particular, the design of the low-dropout voltage regulator is not limited to the disclosed embodiments, and gives examples of many alternatives as possible for the features included in the embodiments discussed. However, it is intended that any modifications, equivalents and substitutions of the disclosed concepts be included within the scope of the claims which are appended hereto.

Features recited in separate dependent claims may be advantageously combined. Moreover, reference signs used in the claims are not limited to be construed as limiting the scope of the claims.

Furthermore, as used herein, the term "comprising" does not exclude other elements. In addition, as used herein, the article "a" is intended to include one or more than one component or element, and is not limited to be construed as meaning only one.

The invention claimed is:

1. A low-dropout regulator for low voltage applications, comprising:
an input supply terminal to provide an input supply voltage,
a reference supply terminal to provide a reference supply voltage,
an error amplifier having a first and second input terminal and an output terminal,
a pass device having a control node to control a conductivity of the pass device,
a buffer circuit being arranged between the output terminal of the error amplifier and the control node of the pass device,
wherein the buffer circuit comprises a first current path being arranged between the input supply terminal and the reference supply terminal, wherein the first current path includes a driver comprising a first transistor having a control node to control a conductivity of the first transistor, the first transistor being embodied as an NMOS transistor,
wherein the output terminal of the error amplifier is coupled to the control node of the first transistor,
wherein the control node of the pass device is coupled to a first internal node of the first current path located between the first transistor and the reference supply terminal,
wherein the first current path comprises a current source being arranged in the first current path between the power supply terminal and the first transistor,
wherein the current source is driven by band gap voltage,
wherein the current source is a p-type channel, and
wherein the first transistor is an n-type channel.

2. The low-dropout regulator of claim 1,
wherein the first transistor has a drain node being coupled to the input supply terminal, and a source node being coupled to the first internal node of the first current path.

3. The low-dropout regulator of claim 1,
wherein the first transistor is configured as a source follower transistor.

4. The low-dropout regulator of claim 1,
wherein the first transistor is configured as a NMOS transistor.

5. The low-dropout regulator of claim 1,
wherein the buffer circuit comprises a second transistor being arranged between the power supply terminal and the first internal node of the first current path.

6. The low-dropout regulator of claim 5,
wherein the second transistor is configured as a PMOS transistor.

7. The low-dropout regulator of claim 5,
wherein the second transistor has a source node being coupled to the power supply terminal, and a drain node being coupled to the first internal node of the first current path.

8. The low-dropout regulator of claim 1,
wherein a second transistor has a control node being connected to a second internal node of the first current path, the second internal node being arranged between the current source of the first current path and the first transistor.

9. The low-dropout regulator of claim 8, comprising:
a third transistor being arranged between the power supply terminal and the second internal node of the first current path.

10. The low-dropout regulator of claim 9,
wherein the third transistor has a source node being connected to the power supply terminal, and a drain node being connected to the second internal node of the first current path,
wherein the third transistor has a control node to apply a control signal for controlling a conductivity of the third transistor, and
wherein the buffer circuit is configured to generate the control signal for controlling the conductivity of the third transistor in response to an amount of a load current of the low-dropout regulator.

11. The low-dropout regulator of claim 1,
wherein the buffer circuit comprises a current mirror being configured to provide a biasing current in the first current path of the buffer circuit,
wherein the buffer circuit comprises a second current path, and
wherein the current mirror is configured to provide the bias current in the first current path in response to a current in the second current path.

12. The low-dropout regulator of claim 11, comprising:
a fourth transistor,
wherein the second current path comprises a second current source being arranged between the power supply terminal and the current mirror, and
wherein the fourth transistor is arranged between the power supply terminal and a third internal node of the second current path located between the second current source and the current mirror.

13. The low-dropout regulator of claim 1, comprising:
an output current path including the pass device and an output terminal to provide a regulated output voltage, and
a feedback path including a capacitor being arranged between the output terminal and a third input terminal of the error amplifier.

14. A communication device, comprising:
a low-dropout regulator of claim 1 to provide a regulated output voltage, and
wherein the communication device is embodied as a sensor or a battery-powered device.

15. A low-dropout regulator for low voltage applications, comprising:
an input supply terminal to provide an input supply voltage,
a reference supply terminal to provide a reference supply voltage, an error amplifier having a first and second input terminal and an output terminal, a pass device having a control node to control a conductivity of the pass device, a buffer circuit being arranged between the output terminal of the error amplifier and the control node of the pass device, wherein the buffer circuit comprises a first current path being arranged between the input supply terminal and the reference supply terminal, wherein the first current path includes a driver comprising a first transistor having a control node to control a conductivity of the first transistor, the first transistor being embodied as an NMOS transistor, wherein the output terminal of the error amplifier is coupled to the control node of the first transistor, wherein the control node of the pass device is coupled to a first internal node of the first current path located between the first transistor and the reference supply terminal, wherein the buffer circuit comprises a current mirror being configured to provide a biasing current in the first current path of the buffer circuit, wherein the buffer circuit comprises a second current path, and wherein the current mirror is configured to provide the bias current in the first current path in response to a current in the second current path.

16. The low-dropout regulator of claim 15, comprising:

a fourth transistor, wherein the second current path comprises a second current source being arranged between the power supply terminal and the current mirror, and wherein the fourth transistor is arranged between the power supply terminal and a third internal node of the second current path located between the second current source and the current mirror.

* * * * *